Oct. 6, 1970  YUKIO SAHARA  3,531,871
METHODS AND APPARATUS FOR CONTINUOUS FREEZE-DRYING
Filed Aug. 12, 1968  5 Sheets-Sheet 2

INVENTOR
Yukio Sahara

United States Patent Office 3,531,871
Patented Oct. 6, 1970

3,531,871
METHODS AND APPARATUS FOR CONTINUOUS FREEZE-DRYING
Yukio Sahara, 5–8 Kori Shinmachi,
Neyagawa, Osaka Prefecture, Japan
Filed Aug. 12, 1968, Ser. No. 752,012
Claims priority, application Japan, Aug. 23, 1967, 42/54,079
Int. Cl. F26b 3/28; H05b 9/00
U.S. Cl. 34—1                9 Claims

ABSTRACT OF THE DISCLOSURE

Methods and apparatus to freeze-dry food and medical stuffs continuously by rotating a plurality of vacuum containers on a circular process line which is divided into four subprocesses of loading, pre-exhaustion, main exhaustion and re-filling in cyclical sequence; the main exhaustion process has a heating field with atmospheric pressure where the object enclosed in such vacuum container is heated by the dielectric effect of high-frequency flux or by the irradiation of infrared ray or other radiating heat to have the frozen moisture sublimated in the vacuum.

---

The present invention relates to methods of, and apparatus for, freeze-drying various fresh food and medical stuffs, and in its more particular aspects it has to do with full continuous freeze dry of such stuffs with higher efficiency and effectiveness but lower cost than batch-type and semi-continuous ones.

It is said that freeze-drying is a preferable treatment for preservation of fresh food and medical stuffs which have high water contents or are very unstable to heat, because freeze-drying not only keeps the shape, luster, nutriment, taste and other natural properties of such stuffs mostly intact but also allows such stuffs to return to the original conditions instantly with a mere addition of moisture.

The general method of freeze-drying is that a frozen object or charge is heated in a substantial vacuum of 0.1 to 0.001 mm. Hg to sublimate the frozen water contents out of the object, thus obtaining a perforative solid dried product. It is therefore indispensable to freeze-drying treatment that the object is heated in the vacuum sufficiently for such sublimation of water content.

In conventional freeze-drying, a heating means is provided within each vacuum container which is connected to a vacuum pump, and the frozen objects are taken in and out of the vacuum containers lot by lot in batch-type operation. The heating may be either external or internal. The external heating is such that the object is heated by the introduction of heat from the outside of the object, for instance by means of heat exchanging fins in which steam or other similar heating medium is circulated. In the external heating the exterior portions of the object will be heated and dried inevitably prior to the interior portions, and therefore heat will be transferred into the interior undried frozen portions by way of the exterior dried perforated portions where heat conductivity is already considerably lowered, thereby not only interior drying will be delayed but also temperature of the object will be so far from easy control as to cause overheating in the exterior portions. The internal heating is such that the object is heated by the creation of heat at the inside of the object itself, in usual cases by the dielectric effect of high-frequency or super-high-frequency wave energy produced from an oscillator provided within the vacuum container where the object is enclosed. In the internal heating there will be a danger of discharging in an electric field of substantial strength provided under substantially reduced pressure. The maximum allowable output of a super-high-frequency oscillator, such as a magnetron, free from the danger of discharging is approx. 1 W per gram of moisture contained in the object, the frequency being 2450 mc. Since the maximum output of commercial magnetrons is 5 kwh. or so at present, the available internal heating capacity will inevitably be insufficient for a practical speed of drying without a danger of electric discharging. If a large number of magnetrons with such small output are employed to increase the heating capacity, the vacuum container in which the magnetrons are enclosed will have to be so much larger as to increase the cost of equipment correspondingly. In either way of heating, therefore, conventional freeze-drying is far from satisfaction in efficiency, effectiveness and/or cost.

There have been some attempts to speed up the drying process by continuously taking the solid objects in and out of the vacuum containers, but such attempts result in semi-continuous operation care is taken to avoid losing vacuum on the occasion of taking in and out, thus failing to meet the efficiency requirements of mass production sufficiently.

A major object of the invention is to provide full continuous freeze drying with sufficiently large heating capacity without the danger of electric discharge in the vacuum nor the enlargement of the vacuum container size.

A more specific object of the invention is to make the vacuum containers of glass, clay, synthetic resin or other similar material having a substantially low dielectric loss factor (dielectric constant times dielectric power factor) for high-frequency flux, and to have such vacuum containers pass through a heating tunnel which is open to atmospheric pressure and provided with sufficiently large heating capacity of high-frequency oscillators, thus heating the object at the inside of each vacuum container with high-frequency flux applied from the outside of the vacuum container by making use of the low dielectric loss of such materials for high-frequency flux.

Another specific object of the invention is to make vacuum containers of glass, synthetic resin or other similar material having a substantially high permeability for infrared ray, and to have such vacuum containers pass through a heating tunnel which is opened to atmospheric pressure and provided with sufficiently large heating capacity of infrared ray radiators, thus heating the object at the inside of each vacuum container with infrared ray energy applied from the outside of vacuum container by making use of the high permeability of such materials for infrared ray energy.

Other objects and advantages of the invention will be more fully understood from the following description of preferred forms of the invention shown by way of example in the accompanying drawings in which.

The embodiment shown in FIGS. 1 to 8 has an annular turn table 2 movable along a pair of annular rails 1 by means of wheels 31. An upper main duct 3 is provided at the center of turn table 2, and is rotatable by a driving mechanism A. The main duct 3 is provided with a plurality of branch ducts 4 in a radial arrangement at the top end thereof. The branch ducts 4 are supported on the turn table 2 at the open ends 4' thereof, the ends 4' opening upward. A short duct 6 is joined to the open end 4' of each branch duct 4 by the intermediary of an electric valve 5. A rod 7 is secured to the short duct 6 by means of a rib 7' at the lower end thereof, and is engageable with a holder 8 for the object 40 at the upper end thereof. The short duct 6 is connected to an electromagnetic valve 9 for pre-exhaustion of air and also to another electromagnetic valve 10 for refilling of air. The upper end of duct 6 is provided with a flange 6' to meet a flange 11' of a bell jar 11 by the intermediary of packing in a freely detachable relation. The bell jar 11 is a kind of vacuum container made of glass, clay or other similar material with substantially low dielectric loss factor.

Figure 1:
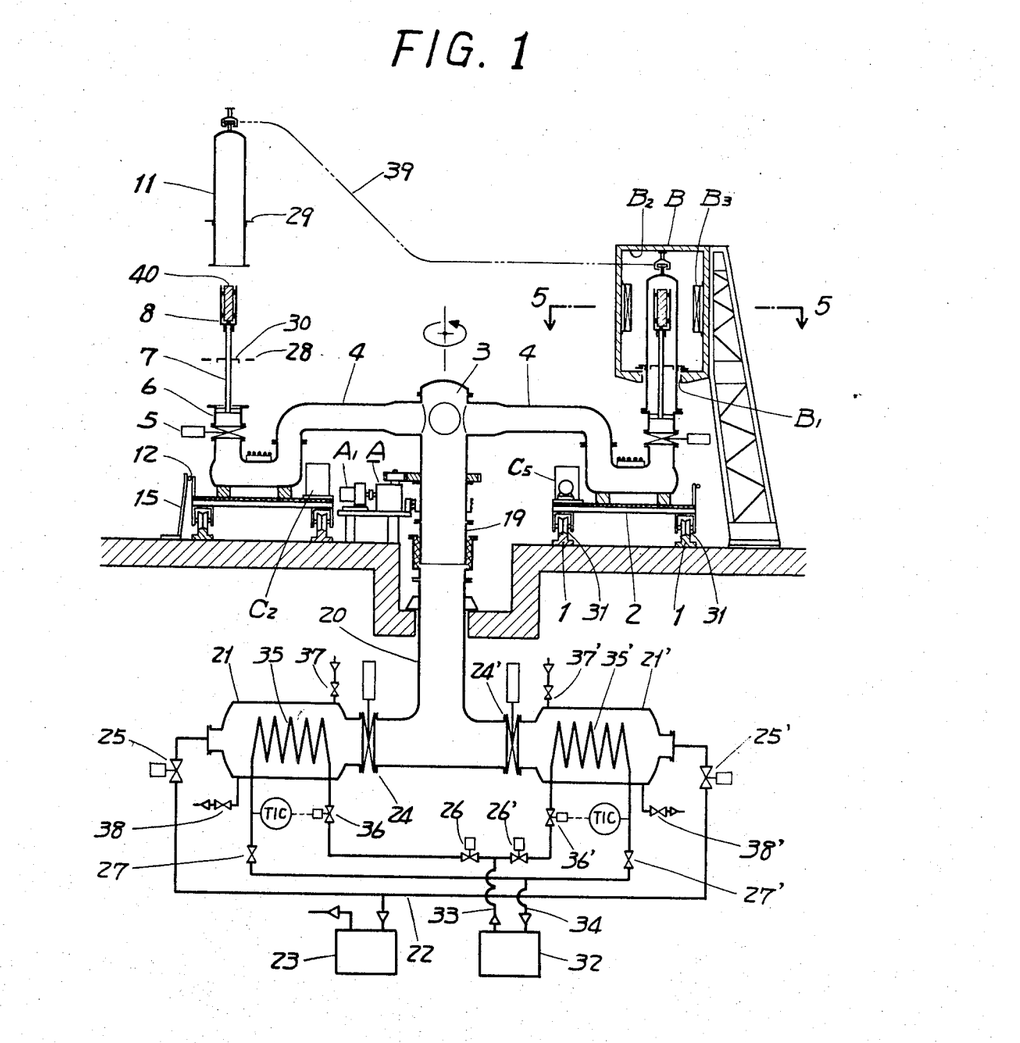
FIG. 1 is a vertical elevation of a freeze-drying apparatus embodying the present invention.
Figure 5:
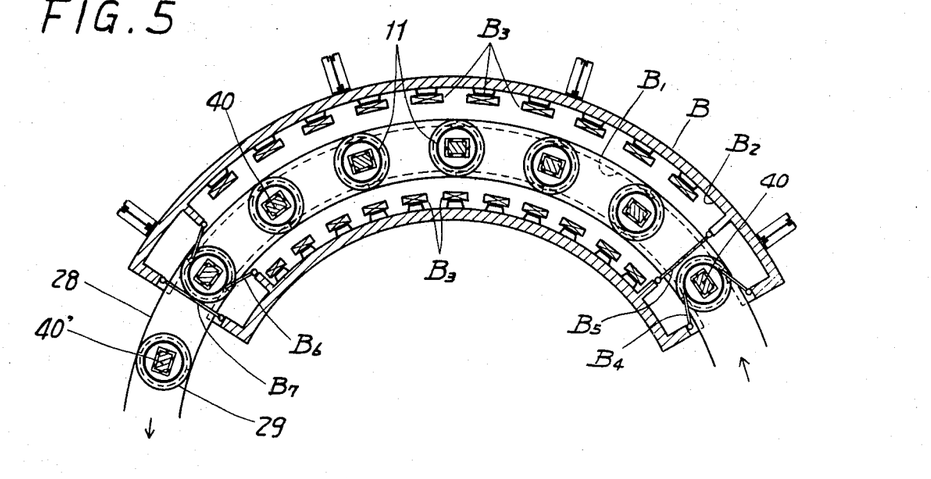
FIG. 5 is a plan view taken on 5—5 line in FIG. 1.

A heating tunnel B in which atmospheric pressure is standing is installed over a part of the rotary locus of bell jars 11 carried on the turn table 2 to permit the bell jars 11 to pass through it as the turn table 2 is rotated. The tunnel B is lined with metallic reflectors B2 on the inner walls thereof to shield high-frequency flux, and is provided with a slit B1 to the full length of the bottom thereof to guide the bell jars 11. A plurality of high-frequency oscillators B3 are provided at the side walls of tunnel B.

Figure 7:
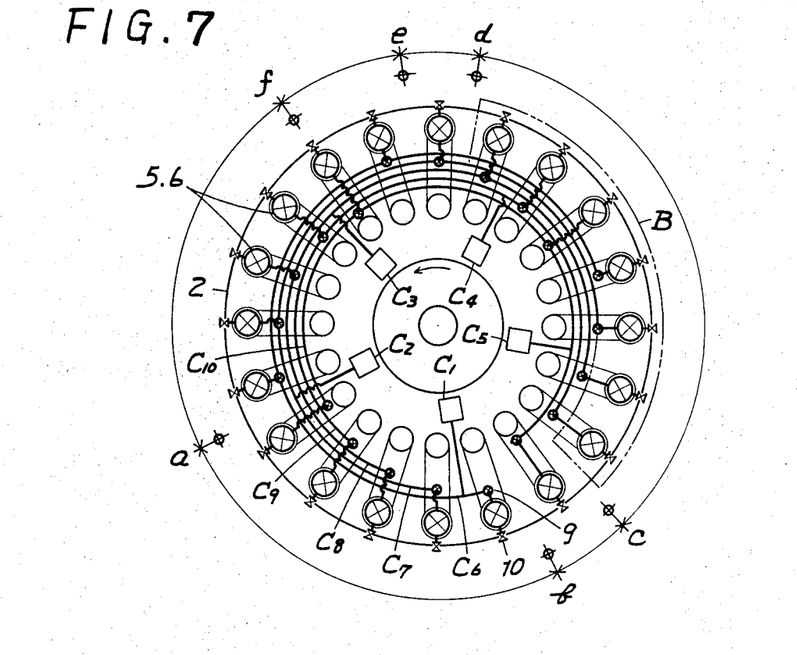
FIG. 7 is a schematic view to show piping for pre-exhaustion of air as well as rotary sequence of process in the embodiment of FIG. 1.

As shown in FIG. 7, the turn table 2 is equipped with five vacuum pumps C1, C2, C3, C4, C5 for pre-exhaustion of air from the bell jars 11. The number of vacuum pumps are same as the number of bell jars running in the pre-exhaustion process of the invention to be described later more particularly, and the total number of bell jars is a natural number times the number of bell jars running in the pre-exhaustion process. As best shown in FIG. 7, the first one of pre-exhaustion valves 9 is connected to the vacuum pump C1 by way of a pipe C6. The second and subsequent three of pre-exhaustion valves 9 are connected to the vacuum pumps C2, C3, C4, C5 by way of pipes C7, C8, C9, C10, respectively. The sixth one of valves 9 is connected to the pump C1 by way of pipe C6 again, and all the subsequent valves 9 are connected to the vacuum pumps similarly in this repeated order.

Figure 2:
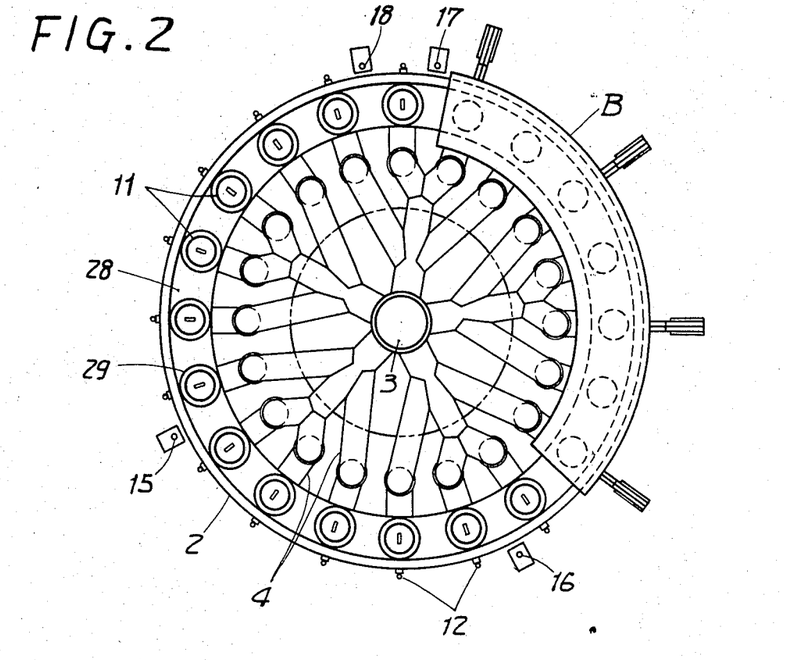
FIG. 2 is a plan view of FIG. 1.
Figure 3:
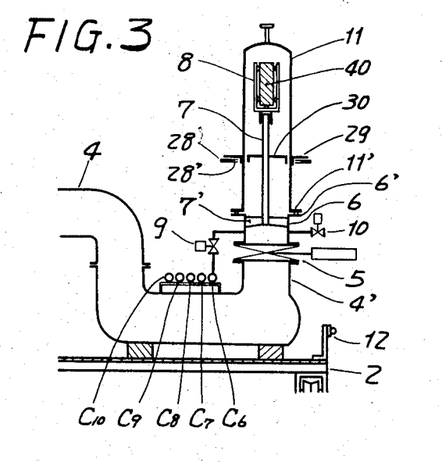
FIG. 3 is an enlargement, in vertical elevation, of a branch duct and its relevant parts in FIG. 1.
Figure 8:
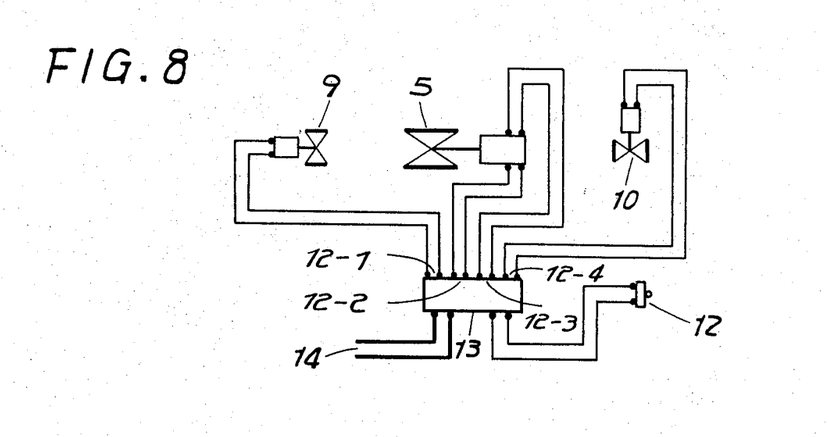
FIG. 8 is a circuit diagram for automatic change-over of valves in the embodiment of FIG. 1.

The turn table 2 is provided with the same number of microswitches 12 as the bell jars 11 at the circumferential periphery thereof. As shown in FIG. 8, each microswitch 12 is combined with a four-way relay 13 which automatically changes-over a power source circuit 14 to contacts 12–1, 12–2, 12–3, 12–4 and again to 12–1 each time the microswitch is actuated, the contact 12–1 for actuation of the electromagnetic valve 9 in charge of pre-exhaustion of air from the bell jar 11, the contacts 12–2 and 12–3 for opening and closing of the electric valve 5 in charge of main exhaustion of air from the bell jar 11, and the contact 12–4 for actuation of the electromagnetic valve 10 in charge of re-filling of air to the bell jar 11. Four microcontacts 15, 16, 17, 18 are located around the turn table 2 in engageable relation with each of the microswitches 12 as the turn table is rotated, as shown in FIG. 2. The microcontacts are in such a circumferential arrangement in relation to the turn table 2 as in proportion to the time required for the four processes of pre-exhaustion, main exhaustion, re-filling and loading.

The rotatable upper main duct 3 is connected to a fixed lower main duct 20 by the intermediary of rotary joint 19. The lower main duct 20 is then connected to a plurality of cold traps 21, 21' in parallel relation by the intermediary of valves 24, 24', and the cold traps 21, 21' are in turn connected to a vacuum pump 23 for main exhaustion of air by way of pipes 22 and stop valves 25, 25'. Each cold trap has its own cooling system which comprises the trap 21 or 21' itself, a cooling tube 35 or 35', an automatic flow regulating valve 36 or 36', a drain valve 38 or 38', a feed stop valve 26 or 26', a return stop valve 27 or 27', and a defrost valve 37 or 37'. The cooling systems are all connected to a refrigerator 32 by way of a feed pipe 33 and a return pipe 34. The cold traps are changed-over by the stop valves 24, 24', 25, 25', 26, 26', 27, 27' to put one of them into service while the others out of service.

Figure 6:
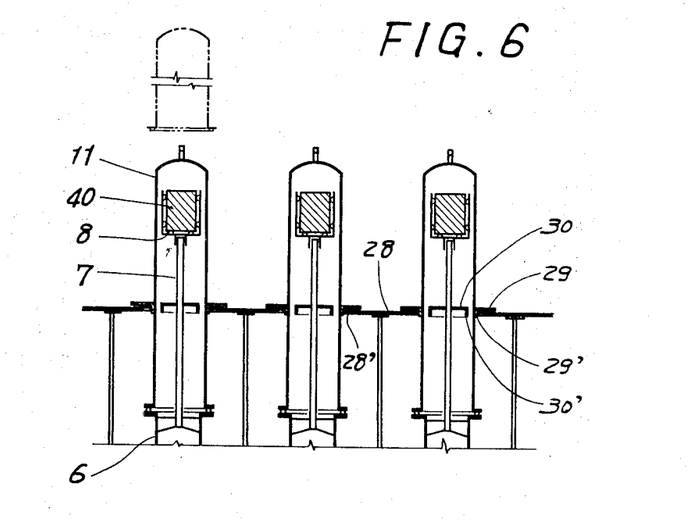
FIG. 6 is an enlargement, in vertical elevation, of vacuum containers and their relevant metallic reflectors in FIG. 5.

As best shown in FIG. 6, high-frequency flux is shielded from leakage by means of metallic reflectors 28, 29 and 30. The reflector 28 is of partially annular metallic plate spanned between the bell jars 11 to shield the slit B1 at the bottom of heating tunnel B. The reflectors 29 are of fully annular metallic plate surrounding each bell jar 11 to shield a hole 28' which is provided in the reflector 28 to allow the flange 11' of bell jar 11 to pass through when the jar is opened and closed. The reflectors 30 are of fully annular metallic net fixed around the rod 7 to shield the open side of bell jar 11. The reflectors 29 and 30 are located at almost the same level, with the outer edge of the former and the inner edge of the latter being bent downward to be in such an opposite relation with each other by the intermediary of bell jar wall as to define the clearance between them to be longer than ¼ the length and narrower than the full amplitude of the applied high-frequency flux. The high-frequency flux is also shielded from leakage by means of self-closing doors B4, B5, B6, B7 made of metallic plate or net, arranged at both ends of heating tunnel B as shown in FIG. 5. All the shielding members 28, 29, 30, B2, B4, B5, B6, B7 are installed sufficiently.

Figure 4:
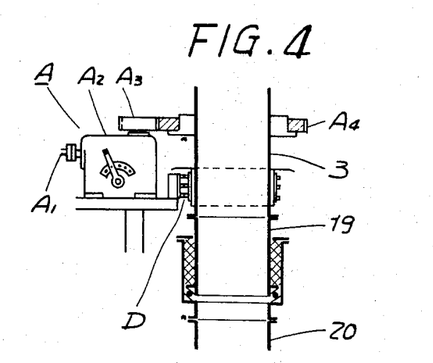
FIG. 4 is an enlargement, in vertical elevation, of a portion of main duct and its relevant parts in FIG. 1.

As shown in FIG. 4, the upper main duct 3 is provided with a trolley mechanism D to supply power to the driving motors of vacuum pumps C1, C2, C3, C4, C5 and the circuits 14 of relays 13. The driving mechanism A for main duct 3 comprises a motor A1, a speed variator A2, a pinion A3 and a gear A4. The numeral 39 in FIG. 1 indicates a guide rail for bell jars 11 to open upward and close downward as the turn table 2 goes round.

In the operation of freeze-drying in reference to FIGS. 1 to 8, each relay 13 is initially set at a desired arrangement, for instance, to change-over the circuit 14 to the contact 12–1 to actuate the valve 9 for pre-exhaustion of air the moment the microswitch 12 touches the microcontact 15 located at the point $a$ of FIG. 7, while one of the cold traps, say, 21 is brought into service by the control of relevant stop valves; and then the whole apparatus is put into running. The vacuum pump 23 reduces pressure in the main exhaustion system which consists of electric valves 5, branch ducts 4, upper main duct 3, joint 19, lower main duct 20, cold trap 21 and connection pipe 22. The vacuum pumps C1, C2, C3, C4, C5 reduce pressure in the pre-exhaustion pipes C6, C7, C8, C9, C10, respectively. The upper main duct 3 is rotated by the driving mechanism A while the lower main duct 20 remains stationary. The turn table 2 is rotated together with the upper main duct 3 in the direction arrow-marked in FIG. 1, carrying the bell jars 11 thereon. As the turn table 2 goes round, the bell jars 11 pass the heating tunnel B with atmospheric pressure on a given part of the guide rail 39 and are detached upward off the flanges 6' of short ducts 6 on another given part of the guide rail 39.

While a bell jar 11 is detached off the short duct 6, that is, in the loading process from $f$ to $a$ of FIG. 7, a holder 8 with a frozen object 40 is put on the top of rod 7. Then the bell jar 11 is lowered down to the flange 6' of short duct 6 as it approaches to the end of the loading process, now enclosing the object 40 therein.

At the point $a$ the microswitch 12 touches the microcontact 15 to have the relay 13 change-over to the contact 12–1 to open the electromagnetic valve 9. Air is then exhausted out of the bell jar 11 by way of the opened valve 9 and its relevant pipe C6 by the action of vacuum pump C1. In this manner in the pre-exhaustion process from $a$ to $b$ of FIG. 7, the bell jar 11 is exhausted of air nearly down to the negative pressure which is standing in the branch duct 4, thereby balancing pressure at both sides of the electric valve 5 to facilitate the succeeding opening of valve 5 while unbalancing pressure at both sides of the wall of the bell jar 11 to keep the jar 11 firmly to the flange 6' of short duct 6.

At the point $b$ the microswitch 12 touches the microcontact 16 to have the relay 13 change-over to the contact 12–2 to open the electric valve 5 while allowing the electromagnetic valve 9 to close, thus the bell jar 11 is transferred from the pre-exhaustion process into the main exhaustion process without disturbing the negative pressure at both sides of electric valve 5. In the main exhaustion process from $b$ to $e$ of FIG. 7, the bell jar 11 is always kept at a given substantial vacuum by the action of vacuum pump 23. The electric valve 5 is kept fully opened from $b$ to $d$ of FIG. 7 by the action of a limit switch (not shown) provided therein. After passing the point $c$ the bell jar 11 opens the shielding doors B4, B5 and enters the heating tunnel B along the slit B1. As the bell jar 11 goes through the electric field provided by the high-frequency oscillators B3 in the tunnel B, the object 40 which has a substantially high dielectric loss factor is heated internally by the effect of high-frequency flux to sublimate the frozen moisture thereof under the negative pressure standing within the bell jar 11.

More particularly in the heating tunnel B, the object 40 which is kept in a vacuum of approx. 0.1 mm. Hg within the bell jar 11 goes through an electric field defined by the shielding members 28, 29, 30, B2, B4, B5, B6, B7, being exposed to high-frequency flux flowing through the wall of bell jar 11 which is made of a material with a substantially low dielectric loss factor. There then electric energy is converted into thermal energy in proportion to the strength of electric field, frequency of flux, and dielectric loss factor of the object, thereby the temperature of the object is raised approx. to $-20°$ or $-25°$ C. which is higher than the saturation temperature of moisture at the standing negative pressure and therefore the frozen moisture is quickly sublimated out of the object 40. The more moisture is sublimated, the more the dielectric loss factor is decreased and accordingly the less the object is heated thereby overheating will be considerably avoided. Thus the object is dried sufficiently into a perforated solid product, before the bell jar 11 opens the shielding doors B6, B7 and leaves the tunnel B.

The vapor sublimated out of the object 40 is drawn from the bell jar 11 to the cold trap 21 by way of the electric valve 5, branch duct 4, upper main duct 3, joint 19 and lower main duct 19. The condensable matters are trapped on the cooling tube 35, while non-condensable gas is further drawn to the vacuum pump 23 by way of the pipe 22, and therefore the main exhaustion system is always kept at a given substantial vacuum. When so much condensate is trapped on the cooling tube 35 as to lower the trapping capacity substantially, the trap 21 is put out of service and another trap 21' is put into service instead by the control of relevant stop valves 24, 24', 25, 25', 26, 26', 27, and 27'.

At the point $d$ immediately after the tunnel B, the microswitch 12 touches the microcontact 17 to have the relay 13 change-over to the contact 12–3 to begin to close the electric valve 5, which is completely closed before the microswitch 12 touches the microcontact 18 at the point $e$ thus isolating the bell jar 11 completely from the branch duct 4 where a given substantial negative pressure is always standing.

At the point $e$ the microswitch 12 touching the microcontact 18 has the relay 13 change-over to the contact 12–4 to open the electromagnetic valve 10. Clean dry air is then sucked into the bell jar 11 with negative pressure by way of the opened valve 10 and a filter (not shown) provided on the valve 10. Thus atmospheric pressure is recovered within the bell jar 11 and therefore pressure is balanced within and without the bell jar 11 to facilitate the succeeding detaching of bell jar 11 from the flange 6' of short duct 6, ending the re-filling process designated from $e$ to $f$ in FIG. 7.

After the re-filling process, the bell jar 11 is returned back again into the loading process designated from $f$ to $a$ in FIG. 7. In the loading process, the bell jar 11 is opened upward and the holder 8 with the dried object 40 is put off, and in place another holder with a new object is put on, the rod 7. The bell jar 11 with the new object 40 then goes into the next round, the electromagnetic valve 10 being allowed to close at the point $a$ where the microswitch 12 touches the microcontact 15. As the turn table 2 is rotated continuously, each of the bell jars 11 carried on it goes through the processes of loading, pre-exhaustion, main exhaustion and re-filling in sequence, thereby delivering the dried products continuously.

As described above, there are four processes in freeze-drying making use of the embodiment shown in FIGS. 1 to 8; namely, loading process designated from $f$ to $a$, pre-exhaustion process from $a$ to $b$, main exhaustion process from $b$ to $e$, and re-filling process from $e$ to $f$. There are always a plurality of bell jars 11 running in each of the four processes. And there are always five bell jars 11 running in the pre-exhaustion process of the present embodiment, each bell jar pre-exhausted of air by an independent vacuum pump C1, C2, C3, C4 or C5 in such a manner that, as one jar goes out of the pre-exhaustion process, another jar comes into the process to be exhausted of air by the same pump used for the leaving jar. Therefore there are different pressures standing in five jars running in the pre-exhaustion process. This prumping rotation not only quickens the pre-exhaustion time for each jar but also excludes any idle time of each pump.

The heating tunnel B may be divided into a plurality of electric compartments longitudinally, each compartment providing a different strength of electric field in proportion to the dielectric loss factor of the object 40 which is usually decreased as the object 40 gets more and more dried through the heating course of tunnel B, thereby almost completely excluding a possibility of over-heating the object on one hand and sufficiently including a possibility of treating a wide range of different objects with different dielectric loss factors on the other hand.

Figure 9:
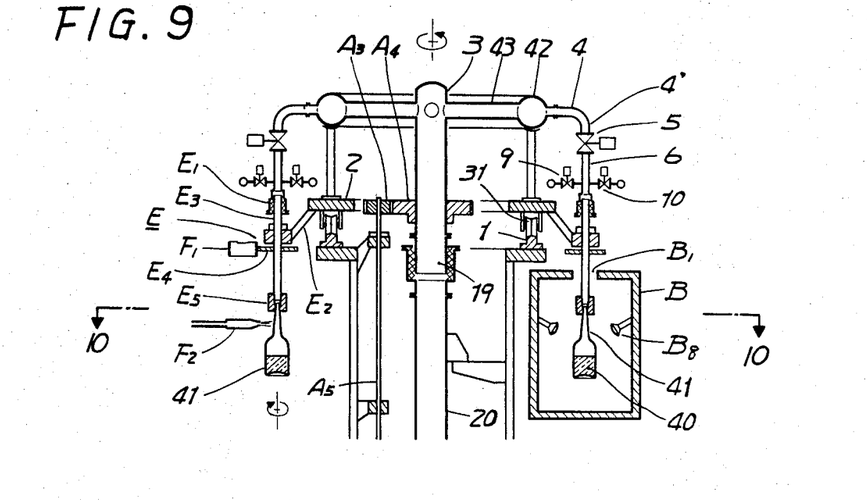
FIG. 9 is a vertical elevation of another embodiment of the invention, with a lower portion cut away.
Figure 10:
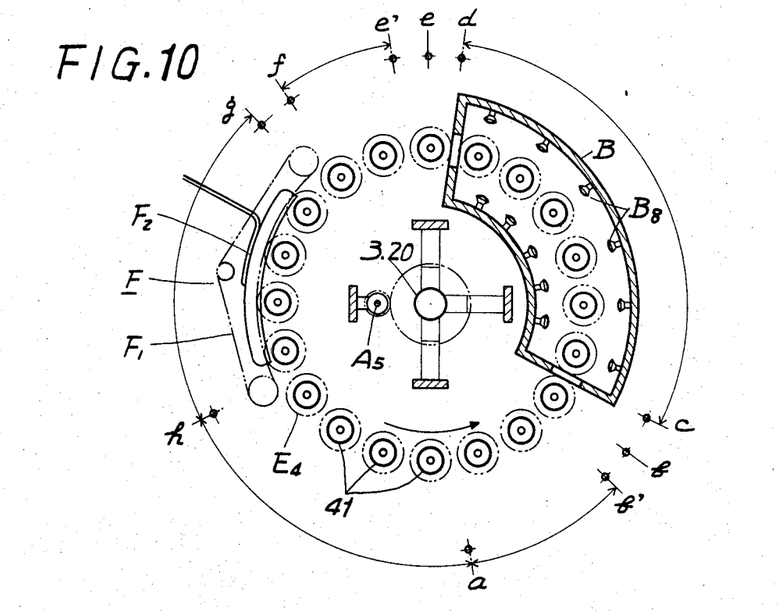
FIG. 10 is a plan view taken on 10—10 line of FIG. 9, showing rotary sequence of process as well.

The embodiment shown in FIGS. 9 and 10 is especially for freeze-drying medical stuffs in glass ampoules permeable of infrared ray by the utilization of infrared ray as the heating source for sublimation of moisture. Medical or food stuffs of special properties for instance including useful bacteria or strains are often subject to denaturing of protein or sterilization of such bacteria when heated internally by the dielectric effect of high-frequency wave—through the sterilization is usually most desirable for general food stuffs. In such special cases, external heating with infrared ray will be preferable in freeze drying. In addition, glass ampoules or similar containers will conveniently require a sealing process after the object is freeze-dried. These requirements will be fulfilled by the embodiment shown in FIGS. 9 and 10.

The embodiment in FIGS. 9 and 10 has a construction and function fundamentally similar to the one in FIGS. 1 to 8. Therefore similar members are designated by same numbers.

In FIG. 9, an upper main duct 3 is provided at the center of a turn table 2 which is movable along a pair of annular rails 1 by means of wheels 31. The upper main duct 3 is rotatable by a driving mechanism including a shaft A5, a pinion A3 and a gear A4. A plurality of branch ducts 4 are connected to the upper main duct 3 by the intermediary of straight ducts 42 and an annular duct 43 which is supported on the turn table 2. Each branch duct 4 is opened downward, and its open end 4' is connected to a short duct 6 by the intermediary of an electromagnetic valve 5. The short duct 6 is connected to an electromagnetic valve 9 for pre-exhaustion and also to another electromagnetic valve 10 for re-filling.

The embodiment in FIGS. 9 and 10 is provided with a plurality of attachments E for loading ampoules 41 and also a mechanism F for sealing the ampoules 41. Each ampoule loading attachment E comprises a joint E1, an arm E2 secured to the turn table 2, an ampoule-loading pipe E3 connected to the short duct 6 by the intermediary of joint E1 and supported by the arm E2 in rotatable relation, a friction wheel E4 fixed around the pipe E3, and a rubber piece E5 affixed at the lower end of pipe E3 to hold an ampoule 41 tightly. The ampoule sealing mechanism F comprises a belt F1 to revolve the ampoule 41 and a burner F2 to seal the ampoule 41.

A heating tunnel B opened to atmospheric pressure is installed under a part of the rotary locus of ampoule-loading pipes E3 carried along the turn table 2 to permit the pipes E3 and loaded ampoules 41 to pass through it as the turn table 2 is rotated. The tunnel B is provided with a slit B1 to the full length of the ceiling thereof to guide the ampoule-loading pipes E3, and also equipped with a plurality of infrared ray radiators B8 at the side walls thereof to provide an irradiation field therein.

The rotary upper main duct 3 is connected to a stationary lower main duct 20 by the intermediary of a joint 19. The embodiment is further provided with vacuum pumps and pipings for pre-exhaustion of air; vacuum pump, refrigerator, cold traps, valves and pipings for main exhaustion; electric relays and circuits including microswitches and microcontacts to change-over the processes; all of which are not shown in FIGS. 9 and 10 because they are quite similar to FIGS. 1 to 8.

In the operation of freeze-drying in reference to FIGS. 9 and 10, initially the electric relays are pre-arranged for the loading process from $h$ to $a$, pre-exhaustion process from $a$ to $b'$, main exhaustion process from $b$ to $e$, re-filling process from $e'$ to $f$, and sealing process from $g$ to $h$. Then the whole apparatus is put into running.

In the loading process an ampoule 41 containing a frozen object 40 is put on a loading pipe E3 by means of the affixed rubber piece E5. At the point $a$ the electromagnetic valve 9 is opened to pre-exhaust air out of the ampoule 41 by way of the loading pipe E3 and short duct 6. At the point $b'$ the valve 9 is closed to finish the pre-exhaustion process. At the point $b$ the electromagnetic valve 5 is opened for main exhaustion of air by way of the branch duct 4 to keep the inside of ampoule 41 at a given substantial vacuum. The ampoule 41 then goes through the heating tunnel B from $c$ to $d$, during which it is exposed to infrared ray from the radiators B8. The object 40 heated externally by the infrared ray has its frozen moisture sublimated in the vacuum standing within the ampoule 41. Thus the object is dried sufficiently, before the ampoule 41 goes out of the tunnel B. At the point $e$ the electromagnetic valve 5 is closed to finish the main exhaustion process. At the point $e'$ the electromagnetic valve 10 is opened to introduce clean dry air or nitrogen gas into the ampoule 41, and therefore the ampoule 41 gets atmospheric pressure to stand again therein. The re-filling process is finished at the point $f$.

In the sealing process designated from $g$ to $h$, the ampoule 41 is revolved on the loading pipe 3 with the friction wheel E4 being in contact with the belt F1, and the ampoule 41 is sealed by the flame from the burner F2.

The sealed ampoule 41 with dried object 40 is put off, and in place another ampoule with a new object is put on, the loading pipe E3 with rubber piece E5. The ampoule 41 with the new object 40 then goes into the next round. As the turn table 2 is rotated continuously, the dried and sealed products are delivered continuously.

The infrared ray radiators B8 may be replaced by other kind of heat radiators for instance for indirect heating. High-frequency oscillators can be employed in place of infrared ray radiators for ampoules made of glass, clay, synthetic resin and other similar material with substantially low dielectric loss factor, so that the object is heated internally by the dielectric effect.

The embodiment in FIGS. 9 and 10 can be applied to various configurations of ampoules only by interchanging of the attachments E for loading ampoules.

It will thus be seen that freeze drying in accordance with the invention provides full continuous operation with sufficiently large heating capacity without any danger of electric discharge in vacuum and any enlargement of vacuum container size, thus increasing efficiency and effectiveness while decreasing cost.

Since certain changes and modifications may be made in the invention, some of which have been herein suggested, it is intended that the foregoing shall be construed in a descriptive rather than in a limiting sense.

What I claim:

1. An apparatus for freeze-drying food and medical stuffs comprising an upper central rotary duct to be driven by a driving mechanism, a lower central stationary duct connected with said upper central duct by the intermediary of a rotary joint, a turn table rotatable together with said central rotary duct, a plurality of ducts branched from said upper central duct at one end and supported on said turn table at the other open end, a plurality of short ducts joined respectively with said branch ducts at said open end supported on said turn table, a plurality of containers to be capped respectively on said short ducts in detachable relation and to run a horizontally circular locus as carried on said turn table, a tunnel having atmospheric pressure standing therein and equipped with a plurality of high-frequency oscillators and shielding means to provide an electric field therein, and means to guide said containers vertically along said horizontally circular locus in a manner to detach each of said containers from said short duct while it runs along the first part of said circular locus and to engage it to said short duct while it runs along the other parts thereof, each of said short ducts provided with means therein to engage a holder for the object, each of said holders with a frozen object thereon being put on and off said engaging means in said short duct while said container is detached from said short duct along the first part of said circular locus, said containers made of a material with substantially low dielectric loss factor, said lower central duct connected to a vacuum pump by way of a cold trap and relevant pipings to exhaust said short ducts of air to a substantially reduced pressure, each of said short ducts connected with a trio of valve means, one of which is in turn connected to a vacuum pump to pre-exhaust and container of air from atmospheric pressure down to a substantially reduced pressure while said container runs along the second part of said circular locus, another of which is intermediate said container of air to keep substantially reduced pressure within said container while it runs along the third part of said circular locus, the last one of which is in turn connected to an air source to re-fill said container with air from the substantially reduced pressure up to atmospheric pressure while it runs along the forth part of said circular locus, said tunnel located in the third part of said circular locus to heat the object by the dielectric effect of high-frequency flux through said container to sublimate frozen moisture out of the object to dry the same, the fourth part of said circular locus being adjacent to the first part thereof.

2. An apparatus for freeze-drying food and medical stuffs comprising an upper central rotary duct to be driven by a driving mechanism, a lower central stationary duct connected with said upper central duct by the intermediary of a rotary joint, a turn table rotatable together with said central rotary duct, a plurality of ducts branched from said upper central duct at one end and supported on said turn table at the other open end, plurality of short ducts joined respectively with said branch ducts at said open end supported on said turn table, a plurality of containers to be capped respectively on said short ducts in detachable relation and to run a horizontally circular locus as carried on said turn table, a tunnel having atmospheric pressure standing therein and equipped with a plurality of infrared ray radiators to provide an irradiation field therein, and means to guide said containers vertically along said horizontally circular locus in a manner to detach each of said container from said short duct while it runs along the first part of said circular locus and to engage it to said short duct while it runs along the other parts thereof, each of said short ducts provided with means therein to engage a holder for the object, each of said holders with a frozen object thereon being put on and off said engaging means in said short duct while said container is detached from said short duct along the first part of said circular locus, said containers made of a material with substantially high permeability for infrared ray, said lower central duct connected to a vacuum pump by way of a cold trap and relevant pipings to exhaust said short ducts of air to a substantially reduced pressure, each of said short ducts connected to a trio of valve means, one of which is in turn connected to a vacuum pump to pre-exhaust said container of air from atmospheric pressure down to a substantially reduced pressure while said container runs along the second part of said circular locus, another of which is intermediate said short duct and said branch duct to exhaust said container of air to keep substantially reduced pressure within said container while it runs along the third part of said circular locus, the last one of which is in turn connected to an air source to re-fill said container with air from the substantially reduced pressure up to atmospheric pressure while it runs along the fourth part of said circular locus, said tunnel located in the third part of said circular locus to heat the object by the irradiation of infrared ray through said container to sublimate frozen moisture out of the object to dry the same, the fourth part of said circular locus being adjacent to the first part thereof.

3. An apparatus for freeze-drying food and medical stuffs comprising an upper central rotary duct to be driven by a driving mechanism, a lower central stationary duct connected with said upper central duct by the intermediary of a rotary joint, a turn table rotatable together with said central rotary duct, a plurality of ducts branched from said upper central duct at one end and supported on said turn table at the other open end, a plurality of short ducts joined respectively with said branch ducts at said open end supported on said turn table, a plurality of containers to be capped respectively on said short ducts in detachable relation and to run a horizontally circular locus as carried on said turn table, a tunnel having atmospheric pressure standing therein and equipped either with a plurality of high-frequency oscillators and shielding means to provide an electric field therein or with a plurality to infrared ray radiators to provide an irradiation field therein, and means to guide said containers vertically along said horizontally circular locus in a manner to detach each of said containers from said short duct while it runs along the first part of said circular locus and to engage it to said short duct while it runs along the other parts thereof, each of said short ducts provided with means therein to engage a holder for the object, each of said holders with a frozen object thereon being put on and off said engaging means in said short duct while said container is detached from said short duct along the first part of said circular locus, said containers made of a material either with substantially low dielectric loss factor for high-frequency flux or with substantially high permeability for infrared ray, said lower central duct connected to a vacuum pump by way of a cold trap and relevant pipings to exhaust said short ducts of air to a substantially reduced pressure, each of said short ducts connected to a trio of valve means, one of which is in turn connected to a vacuum pump to pre-exhaust said container of air from atmospheric pressure down to a substantially reduced pressure while said container runs along the second part of said circular locus, another of which is intermediate said short duct and said branch duct to exhaust said container of air to keep substantially reduced pressure within said container while it runs along the third part of said circular locus, the last one of which is in turn connected to an air source to re-fill said container with air from the substantially reduced pressure up to atmospheric pressure while it runs along the fourth part of said circular locus, the number of said vacuum pumps connected to said short ducts by way of pipings is same as the number of said containers running along the second part of said circular locus, each of said vacuum pumps exhausting one of said containers independently in a manner that, as one container goes out of the second part of said circular locus, another container comes thereinto to be exhausted of air by the same vacuum pump used for the leaving one, said tunnel located in the third part of said circular locus to heat the object either by the dielectric effect of high-frequency flux or by the irradiation of infrared ray through said container to sublimate frozen moisture out of the object to dry the same, the fourth part of said circular locus being adjacent to the first part thereof.

4. An apparatus for freeze-drying food and medical stuffs comprising an upper central rotary duct to be driven by a driving mechanism, a lower central stationary duct connected with said upper central duct by the intermediary of a rotary joint, a turn table rotatable together with said central rotary duct, a plurality of ducts branched from said upper central duct at one end and supported on said turn table at the other open end, a plurality of short ducts joined respectively with said branch ducts at said open end supported on said turn table, a plurality of containers to be capped respectively on said short ducts in detachable relation and to run a horizontally circular locus as carried on said turn table, a plurality of contact means arranged along said circular locus in a manner to divide said locus into a plurality of parts, a tunnel having atmospheric pressure standing therein and equipped either with a plurality of high-frequency oscillators and shielding means to provide an electric field therein or with a plurality of infrared ray radiators to provide an irradiation field therein, and means to guide said containers vertically along said horizontally circuit locus in a manner to detach each of said containers from said short duct while it runs along the first part of said circular locus and to engage it to said short duct while it runs along the other parts thereof, each of said short ducts provided with means therein to engage a holder for the object, each of said holders with a frozen object thereon being put on and off said engaging means in said short duct while said container is detached from said short duct along the first part of said circular locus, said containers made of a material either with substantially low dielectric loss factor for high-frequency flux or with substantially high permeability for infrared ray, said lower central duct connected to a vacuum pump by way of a cold trap and relevant pipings to exhaust said short ducts of air to a substantially reduced pressure, each of said short ducts connected to a trio of valve means, one of which is an electromagnetic valve connected to a vacuum pump to pre-exhaust said container of air from atmospheric pressure down to a substantially reduced pressure while said container runs along the second part of said circular locus, another of which is an electric or electromagnetic valve intermediate said short duct and said branch duct to exhaust said container of air to keep substantially reduced pressure within said container while it runs along the third part of said circular locus, the last one of which is an electromagnetic valve connected to an air source to re-fill said container with air from the substantially reduced pressure up to atmospheric pressure while it runs along the fourth part of said circular locus, said tunnel located in the third part of said circular locus to heat the object either by the dielectric effect of high-frequency flux or by the irradiation of infrared ray through said container to sublimate frozen moisture out of the object to dry the same, said turn table provided with the same number of microswitches as said containers at the periphery thereof to be in engageable relations with said contact means arranged along said circular locus, each of said microswitches combined with an electric relay means to actuate and re-set said electric and/or electromagnetic valves every time said microswitch touches said contact means as said container runs along said circular locus thereby causing said exhausting and re-filling of air in the respective parts of said circular locus, the fourth part of said circular locus being adjacent to the first part thereof.

5. An apparatus for freeze-drying food and medical stuffs frozen and dispensed in containers made of a material with substantially low dielectric factor for high-frequency flux or substantially high permeability for infrared ray or other radiating heat, comprising an upper central rotary duct to be driven by a driving mechanism, a lower central stationary duct connected with said upper central duct by the intermediary of a rotary joint, a turn table rotatable together with said central rotary duct, a plurality of ducts branched from said upper central duct at one end and supported on said turn table at the other open end, a plurality of short ducts joined respectively with said branch ducts at said open end supported on said turn table, a plurality of attachments respectively secured to said short ducts to carry said containers along a circular locus as said turn table goes round, a tunnel having atmospheric pressure standing therein and equipped with a plurality of high-frequency oscillators and shielding means to provide an electric field therein or with a plurality of infrared ray or other heat radiators to provide an irradiation field therein, means to seal said containers with the object therein respectively before they are unloaded from said attachments, and means to put said container on and off said attachment as it runs along the first part of said circular locus, said lower central duct connected to a vacuum pump by way of a cold trap and relevant pipings to exhaust said short ducts of air to a substantially reduced pressure, each of said short ducts connected to a trio of valve means, one of which is in turn connected to a vacuum pump to pre-exhaust said container of air from atmospheric pressure down to a substantially reduced pressure while said container runs along the second part of said circular locus, another of which is intermediate said short duct and said branch duct to exhaust said container of air to keep substantially reduced pressure within said container while it runs along the third part of said circular locus, the last one of which is in turn connected to an air or other gas source to re-fill said container with such air or other gas from the substantially reduced pressure up to atmospheric pressure while it runs along the fourth part of said circular locus, said tunnel located in the third part of said circular locus to heat the object either by the dielectric effect of high-frequency flux or by the irradiation of infrared ray or other radiating heat through said container to sublimate frozen moisture out of the object to dry the same, the fourth part of said circular locus being adjacent to the first part thereof.

6. A method of freeze-drying food and medical stuffs which comprises, in combination, the steps of:
(a) putting a frozen charge of such stuff into a container made of material having a substantially low dielectric loss,
(b) connecting said container to a first vacuum source and pre-exhausting said container of gaseous atmosphere to subject the charge therein to a substantial degree of vacuum,
(c) substantially maintaining the vacuum obtained in step (b) while disconnecting said container from said first source of vacuum and connecting it to a second source of vacuum and passing said evacuated container with the charge therein through an electric high-frequency field established in a non-evacuated passage while keeping the vacuum substantially constant within said container by continuous exhaustion of gaseous atmosphere therefrom, thereby heating the evacuated charge by the dielectric heating effect of the high frequency flux established in the non-evacuated passage for sublimating moisture out of the charge and extracting the resulting vapor from the evacuated container,
(d) disconnecting said container from said second vacuum source and refilling said container with gaseous atmosphere up to atmospheric pressure,
(e) removing the so-dried charge, and
(f) practicing at least steps (b), (c) and (d) in a continuous cyclical sequence for one container after another independently while moving a series of such containers around a circular locus with the final step performed in said locus with respect to each container other than the last of the series being immediately followed by the carrying out of the initial step performed in said locus with respect to another container of the sequence.

7. A method of freeze-drying food and medical stuffs which comprises, in combination, the steps of:
(a) putting a frozen charge of such stuff into a container made of material having a substantially high infra-red ray permeability,
(b) connecting said container to a first vacuum source and pre-exhausting said container of gaseous atmosphere to subject the charge therein to a substantial degree of vacuum,
(c) substantially maintaining the vacuum obtained in step (b) while disconnecting said container from said first source of vacuum and connecting it to a second source of vacuum and passing said evacuated container with the charge therein through an infra-red ray field established in a non-evacuated passage while keeping the vacuum substantially constant within said container by continuous exhaustion of gaseous atmosphere therefrom, thereby heating the evacuated charge by the infra-red ray field established in the non-evacuated passage for sublimating moisture out of the charge and extracting the resulting vapor from the evacuated container,
(d) disconnecting said container from said second vacuum source and refilling said container with gaseous atmosphere up to atmospheric pressure,
(e) removing the so dried charge, and
(f) practicing at least steps (b), (c) and (d) in a continuous cyclical sequence for one container after another independently while moving a series of such containers around a circular locus with the final step performed in said locus with respect to each container other than the last of the series being immediately followed by the carrying out of the initial step performed in said locus with respect to another container of the sequence.

8. A method of freeze-drying food and medical stuffs frozen and dispensed in containers made of material having a substantially low dielectric loss, which comprises, in combination, the steps of:
(a) putting such container with a charge of the frozen stuff therein into a process line,
(b) connecting said container to a first vacuum source and pre-exhausting said container of gaseous atmosphere to subject the charge therein to a substantial degree of vacuum, (c) substantially maintaining the vacuum obtained in step (b) while disconnecting said container from said first source of vacuum and connecting it to a second source of vacuum and passing said evacuated container with the charge therein through an electric high-frequency field established in a non-evacuated passage while keeping the vacuum substantially constant within said container by continuous exhaustion of gaseous atmosphere therefrom, thereby heating the evacuated charge by the dielectric heating effect of the high frequency flux established in the non-evacuated passage for sublimating moisture out of the charge and extracting the resulting vapor from the evacuated container, (d) disconnecting said container from said second vacuum source, (e) sealing said container with the freeze-dried charge therein, (f) removing the sealed container from the process line, and (g) practicing the foregoing steps (a) through (f) in a continuous cyclical sequence for one container after another independently while moving a series of such containers around a circular locus with the final step performed in said locus with respect to each container other than the last of the series being immediately followed by the carrying out of the initial step performed in said locus with respect to another container of the sequence.

9. A method of freeze-drying food and medical stuffs frozen and dispensed in containers made of material having a substantially high infra-red ray permeability, which comprises, in combination, the steps of:

(a) putting such container with a charge of the frozen stuff therein into a process line, (b) connecting said container to a first vacuum source and pre-exhausting said container of gaseous atmosphere to subject the charge therein to a substantial degree of vacuum, (c) substantially maintaining the vacuum obtained in step (b) while disconnecting said container from said first source of vacuum and connecting it to a second source of vacuum and passing said evacuated container with the charge therein through an infra-red ray field established in a non-evacuated passage while keeping the vacuum substantially constant within said container by continuous exhaustion of gaseous atmosphere therefrom, thereby heating the evacuated charge by the infra-red ray field established in the non-evacuated passage for sublimating moisture out of the charge and extracting the resulting vapor from the evacuated container, (d) disconnecting said container from said second vacuum source, (e) sealing said container with the freeze-dried charge therein, (f) removing the sealed container from the process line, and (g) practicing the foregoing steps (a) through (f) in a continuous cyclical sequence for one container after another independently while moving a series of such containers around a circular locus with the final step performed in said locus with respect to each container other than the last of the series being immediately followed by the carrying out of the initial step performed in said locus with respect to another container of the sequence.

References Cited

UNITED STATES PATENTS

| 2,907,117 | 10/1959 | Parknson et al. | 34—5 X |
| 3,174,229 | 3/1965 | Stokes et al. | 34—92 |
| 3,280,470 | 10/1966 | Kuntz | 34—5 |

WILLIAM E. WAYNER, Primary Examiner

U.S. Cl. X.R.

34—5, 92; 219—10.55